Aug. 19, 1930.  H. F. BARDWELL  1,773,420
MOTOR MOUNTING
Original Filed March 27, 1926

Inventor:
Harold F. Bardwell
by his attorney
Farnum F. Dorsey

Patented Aug. 19, 1930

1,773,420

UNITED STATES PATENT OFFICE

HAROLD F. BARDWELL, OF ROCHESTER, NEW YORK, ASSIGNOR TO ELECTROMATIC TYPEWRITERS, INC., OF ROCHESTER, NEW YORK, A CORPORATION OF NEW YORK

MOTOR MOUNTING

Application filed March 27, 1926, Serial No. 97,995. Renewed January 13, 1930.

The object of this invention is to provide a simple, convenient and compact arrangement for mounting an electric motor upon and within the frame of a machine, such as a typewriter, which is to be actuated by such motor.

A typewriter is usually provided with a box-like frame, and where the typewriter is to be provided with power-driven mechanism, it is desirable to mount the motor at the lower part of the frame and to conceal and house the motor as far as possible within the frame. At the same time, it is desirable to leave the motor open, so far as may be, for ventilation, and to minimize the weight of the structure.
In accordance with the present invention, it is proposed to provide the motor with a frame, this frame having at one end a plate which is attached removably to, and is preferably flush with, one of the flat plate-like members of the frame of the typewriter or other machine. From this plate the frame of the motor projects inwardly into the space circumscribed by the machine frame, all parts of the motor being located within the plate so as to be enclosed or housed by the machine frame. Since the motor is so protected, it is not necessary to provide the motor with a distinct housing or enclosure in its own structure, and the weight of the motor may thus be considerably reduced, while the working parts of the motor are left open for the circulation of air.

Figure 1:
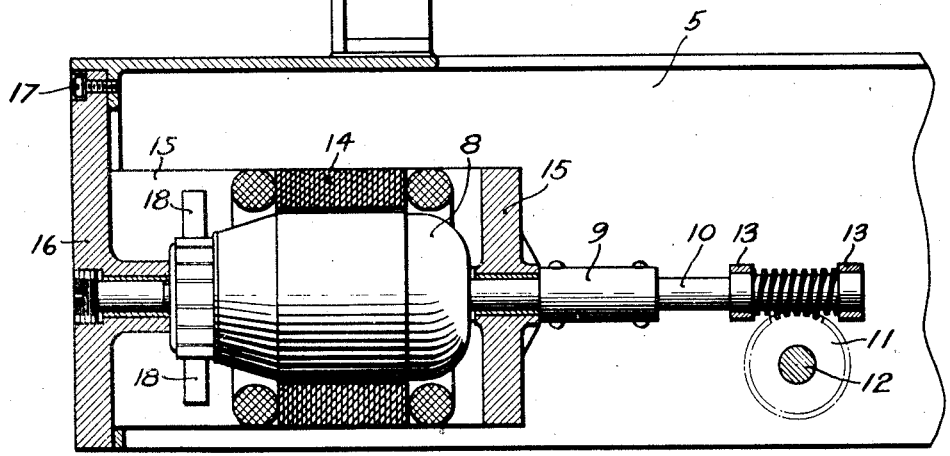
Figure 2:
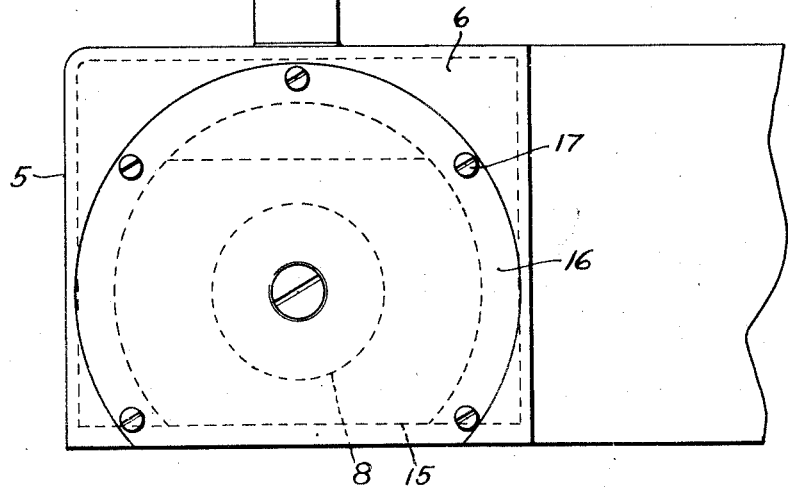

In the accompanying drawings, Fig. 1 is a sectional side elevation of a structure including an electric motor and a portion of the frame of a machine on which the motor is mounted in accordance with the present invention. Fig. 2 is a rear elevation of the parts shown in Fig. 1.

The invention is illustrated as embodied in a machine, such as a typewriter, having a frame which comprises, at the bottom, a vertical side plate 5 and rear plate 6. These lower parts of the frame may support one or more columns 7, upon which the mechanism of the typewriter (not shown) may be carried in the usual manner.

The motor is shown as comprising an armature 8, and the armature shaft is connected, by a coupling 9, with a worm shaft 10 mounted in bearings 13 on the frame. Through the engagement of the worm with a gear 11, the motor may drive a power shaft 12 through which the mechanism of the machine is actuated.

The field core 14 of the motor is mounted on a frame 15 in which the armature shaft has its bearings. This frame projects rigidly from an end plate 16 at the rear end of the motor. The back frame member 6 of the machine is provided with a recess in which the end plate is seated, and the plate is secured to the frame by means of screws 17. This construction is such that the motor may be supported entirely by the end plate and may be readily removed, when necessary, upon removing the screws 17 and disengaging the coupling 9. Since all parts of the motor, including the brushes 18 and their supports (not shown), are enclosed within and protected by the frame members of the machine, it is not necessary to provide the motor itself with any means for closing in the motor frame 15 at the top and bottom. The motor may therefore be of light construction and open for free circulation of air through its structure.

The invention claimed is:

The combination, with the frame of a power-driven machine, said frame having side walls forming a box-like structure, with an opening through one such wall; of an electric motor comprising: a vertical end-plate removably fixed to said wall and closing said opening therein, an open frame fixed to and projecting inwardly from said plate, a field magnet supported by said frame, and an armature journalled on said frame, with its axis normal to the end-plate; the operative parts of the motor being enclosed entirely within said plate and walls.

HAROLD F. BARDWELL.